(12) United States Patent
Onishi et al.

(10) Patent No.: US 11,418,083 B2
(45) Date of Patent: Aug. 16, 2022

(54) MOTOR

(71) Applicant: Nidec Corporation, Kyoto (JP)

(72) Inventors: Tatsuya Onishi, Kyoto (JP); Yasuhiko Iwano, Kyoto (JP); Kosuke Ogawa, Kyoto (JP); Takashi Seguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 67 days.

(21) Appl. No.: 16/977,116

(22) PCT Filed: Jan. 11, 2019

(86) PCT No.: PCT/JP2019/000667
§ 371 (c)(1),
(2) Date: Sep. 1, 2020

(87) PCT Pub. No.: WO2019/176257
PCT Pub. Date: Sep. 19, 2019

(65) Prior Publication Data
US 2020/0412197 A1   Dec. 31, 2020

(30) Foreign Application Priority Data

Mar. 13, 2018 (JP) ............................. JP2018-045469

(51) Int. Cl.
*H02K 5/06* (2006.01)
*H02K 5/173* (2006.01)

(52) U.S. Cl.
CPC ............ *H02K 5/06* (2013.01); *H02K 5/1732* (2013.01)

(58) Field of Classification Search
CPC ............................ H02K 5/06; H02K 5/1732

USPC ...................................................... 310/40 R
See application file for complete search history.

(56) References Cited

FOREIGN PATENT DOCUMENTS

| FR | 2872352 | * 12/2005 | ............... H02K 5/06 |
|---|---|---|---|
| JP | 07-115746 A | 5/1995 | |
| JP | 10-94211 A | 4/1998 | |
| JP | 2002-084699 A | 3/2002 | |
| JP | 2012-039694 A | 2/2012 | |
| JP | 2015-042015 A | 3/2015 | |

OTHER PUBLICATIONS

Official Communication issued in International Patent Application No. PCT/JP2019/000667, dated Apr. 16, 2019.

* cited by examiner

*Primary Examiner* — Terrance L Kenerly
(74) *Attorney, Agent, or Firm* — Keating & Bennett

(57) ABSTRACT

A motor includes a rotor including a shaft extending along a center axis in a lengthwise direction, the rotor being rotatable about the center axis, a stator opposite the rotor with a clearance between the stator and the rotor in a radial direction, and a housing accommodating the rotor and the stator. The housing includes a tubular portion extending along the center axis, and a bottom portion closing a lower opening of the tubular portion. The tubular portion includes, on its inner peripheral surface, a fitting portion fitted to the stator, and a tapered portion with a diameter gradually decreasing downward and located below the fitting portion. The tubular portion includes, in its outer peripheral surface, a recessed portion with an axial position overlapping the tapered portion and extending in a circumferential direction.

5 Claims, 3 Drawing Sheets

MOTOR

CROSS REFERENCE TO RELATED APPLICATIONS

This is a U.S. national stage of PCT Application No. PCT/JP2019/000667, filed on Jan. 11, 2019, and priority under 35 U.S.C. § 119(a) and 35 U.S.C. § 365(b) is claimed from Japanese Application No. 2018-045469, filed Mar. 13, 2018; the entire disclosures of which are hereby incorporated herein by reference.

FIELD OF THE INVENTION

The present disclosure relates to a motor.

BACKGROUND

There has been known a motor in which a stator is fixed to a housing by shrinkage fitting.

A housing for a motor is manufactured by forming a metal material (e.g., an aluminum alloy) into a tubular shape by, for example, die casting molding, and then cutting a portion where dimensional accuracy is required. In manufacturing the housing by die casting, the amount of the metal material directly leads to an increase in manufacturing cost.

SUMMARY

According to an aspect of an example embodiment of the present disclosure, a motor includes a rotor including a shaft disposed along a center axis extending in a lengthwise direction, the rotor being rotatable about the center axis, a stator disposed opposite the rotor with a clearance defined between the stator and the rotor in a radial direction, and a housing accommodating the rotor and the stator. The housing includes a tubular portion extending along the center axis, and a bottom portion closing a lower opening of the tubular portion. The tubular portion includes, on its inner peripheral surface, a fitting portion fitted to the stator, and a tapered portion with a diameter that gradually decreases downward, the tapered portion being located below the fitting portion. The tubular portion includes, in its outer peripheral surface, a recessed portion with an axial position that overlaps the tapered portion, the recessed portion extending in a circumferential direction.

The above and other elements, features, steps, characteristics and advantages of the present disclosure will become more apparent from the following detailed description of the example embodiments with reference to the attached drawings.

DETAILED DESCRIPTION

Figure 1:
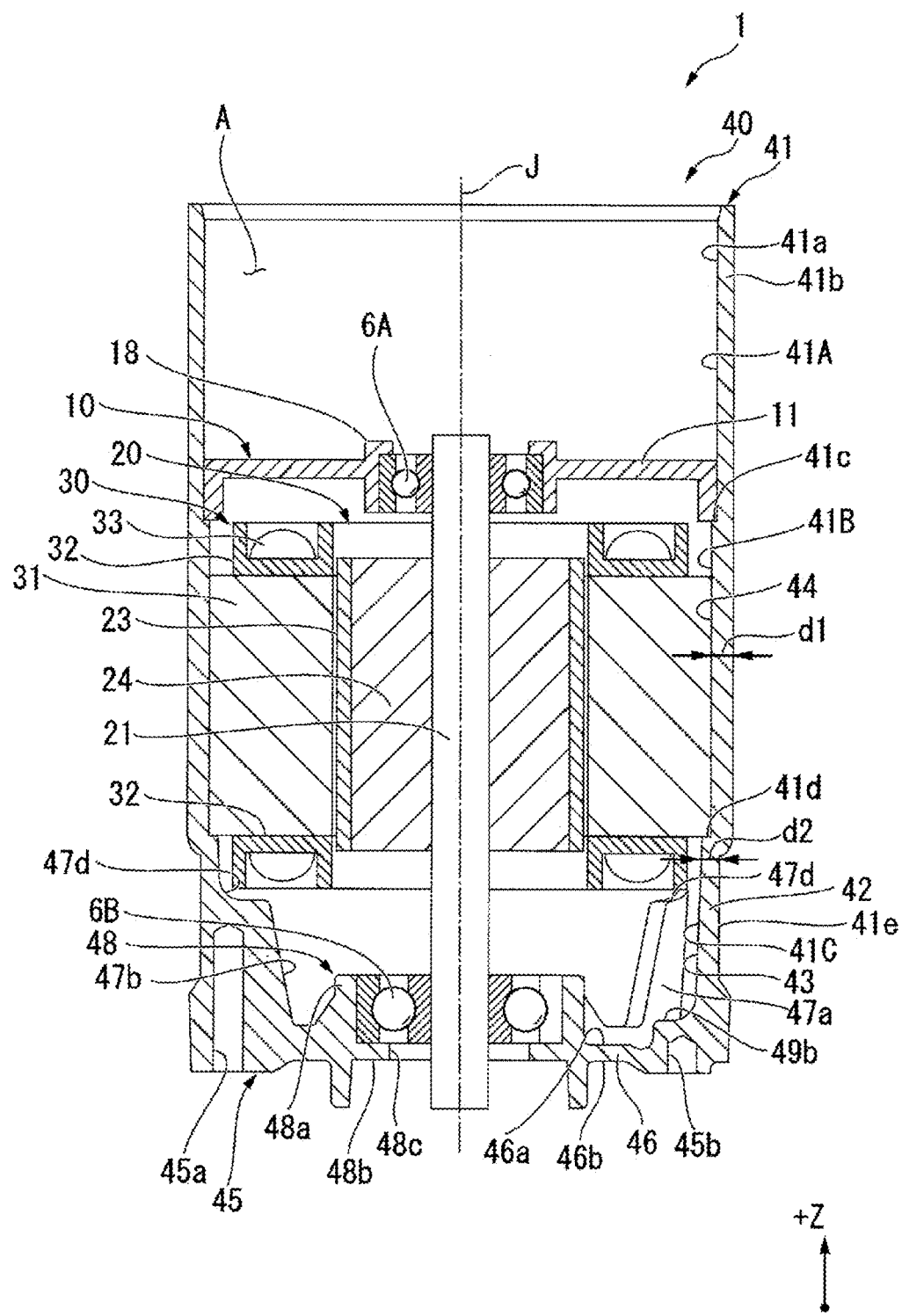
FIG. 1 is a schematic sectional view of a motor according to an example embodiment of the present disclosure.

Motors according to example embodiments of the present disclosure will be described below with reference to the drawings. In the drawings used in the following description, characteristic portions are illustrated in an enlarged manner for convenience in order to make the characteristic portions easy to understand; therefore, the dimensional ratios and the like of the respective constituent elements are not necessarily equal to the actual ones.

In the respective drawings, a Z-axis is illustrated as appropriate. In the respective drawings, a Z-axis direction is defined as a direction parallel to an axial direction of a center axis J illustrated in FIG. 1. In the following description, a positive side (+Z side, first side) in the Z-axis direction is referred to as an "upper side", and a negative side (−Z side, second side) in the Z-axis direction is referred to as a "lower side". It should be noted that the terms "upper side" and "lower side" are merely used for the sake of description and therefore do not intend to limit actual positional relationships and directions. In addition, a direction parallel to the center axis J (i.e., the Z-axis direction) is simply referred to as an "axial direction", "axially" or a "lengthwise direction", a radial direction about the center axis J is simply referred to as a "radial direction" or "radially", and a circumferential direction about the center axis J is simply referred to as a "circumferential direction" or "circumferentially" unless otherwise specified. Also in the following description, the term "in plan view" means a state seen axially.

FIG. 1 is a schematic sectional view of a motor 1 according to an example embodiment. The motor 1 includes a rotor 20, a stator 30, a housing 40, an upper bearing 6A, a lower bearing (bearing) 6B, and a bearing holder 10. The rotor 20 includes a shaft 21.

The rotor 20 is rotatable about the center axis J. The rotor 20 includes the shaft 21, a rotor core 24, and a rotor magnet 23.

The shaft 21 is disposed along the center axis J extending in the lengthwise direction (the axial direction) with its center located on the center axis J. The shaft 21 is supported by the upper bearing 6A and the lower bearing 6B so as to be rotatable about the center axis J.

The rotor core 24 is secured to the shaft 21. The rotor core 24 circumferentially surrounds the shaft 21. The rotor magnet 23 is secured to the rotor core 24. More specifically, the rotor magnet 23 is secured to an outer circumferential side face of the rotor core 24. The rotor core 24 and the rotor magnet 23 rotate together with the shaft 21.

The stator 30 is disposed opposite the rotor 20 with a clearance defined between the stator 30 and the rotor 20 in the radial direction, and surrounds a radially outer side of the rotor 20. The stator 30 includes a stator core 31, insulators 32, and coils 33.

The insulators 32 are made of an insulative material. The insulators 32 cover at least a part of the stator core 31. In driving the motor 1, the coils 33 excite the stator core 31. Each of the coils 33 includes a coil wire (not illustrated) that is wound. The coil wires are respectively wound around tooth portions of the stator core 31 with the insulators 32 interposed between the coil wires and the tooth portions. The coil wires have ends led out upward.

The stator core 31 has a ring shape located around the center axis J. The stator core 31 has an outer peripheral face secured by shrinkage fitting to an inner peripheral face 41a of a tubular portion 41 of the housing 40. In other words, the stator 30 is fitted to the inner peripheral face 41a of the housing 40.

The upper bearing 6A supports an upper end portion of the shaft 21 such that the shaft 21 is rotatable. The upper bearing 6A is located above the stator 30. The upper bearing 6A is supported by the bearing holder 10. The lower bearing 6B supports a lower end portion of the shaft 21 such that the shaft 21 is rotatable. The lower bearing 6B is located below the stator 30. The lower bearing 6B is supported by the housing 40.

In the present example embodiment, each of the upper bearing 6A and the lower bearing 6B is a ball bearing. However, the upper bearing 6A and the lower bearing 6B are not particularly limited, and may be any bearings.

The bearing holder 10 is located above (i.e., above the +Z side of) the stator 30. The bearing holder 10 supports the upper bearing 6A. The bearing holder 10 has, for example, a circular shape concentric with the center axis J in plan view. It should be noted that FIG. 1 illustrates the sectional shape of the bearing holder 10 in a simplified manner.

The bearing holder 10 includes a disk portion 11 and an upper bearing holding portion 18 located at a center of the disk portion 11 in plan view. The disk portion 11 has a circular shape in plan view, and extends in a plate shape along a plane perpendicular to the center axis J. The disk portion 11 has a radial outer end secured to the inner peripheral face 41a of the housing 40. The upper bearing holding portion 18 holds the upper bearing 6A.

The housing 40 accommodates therein the rotor 20 and the stator 30. The housing 40 has the tubular portion 41 and a bottom portion 45. The bottom portion 45 is located at one of opposite openings of the tubular portion 41.

In the present example embodiment, the housing 40 is made of an aluminum alloy. The housing 40 may be made of any metal material as long as it is a metal material moldable by die casting.

The tubular portion 41 surrounds a radially outer side of the stator 30. The tubular portion 41 has a cylindrical shape extending along the center axis J with its center located on the center axis J. The tubular portion 41 has the inner peripheral face 41a directed radially inward and an outer peripheral face 41b directed radially outward.

The tubular portion 41 accommodates therein the rotor 20 and the stator 30. The inner peripheral face 41a of the tubular portion 41 has a first region 41A, a second region 41B, and a third region 41C. The first region 41A, the second region 41B, and the third region 41C are arranged in this order from above. The first region 41A is smaller in diameter than the second region 41B, and the second region 41B is smaller in diameter than the third region 41C. A first step face 41c directed upward is defined between the first region 41A and the second region 41B. A second step face 41d directed upward is defined between the second region 41B and the third region 41C.

The bearing holder 10 is secured in the first region 41A. The bearing holder 10 has a lower end face that is partially in contact with the first step face 41c between the first region 41A and the second region 41B. The bearing holder 10 is thus axially positioned with respect to the housing 40.

An accommodation space A for accommodating a controller (not illustrated) configured to control the rotation of the motor 1 is defined radially inward of the first region 41A at a position above the bearing holder 10. In the accommodation space A, the controller is connected to the coil wires extending from the stator 30.

The second region 41B surrounds the radially outer side of the stator 30. A fitting portion 44 fitted to the stator core 31 is provided in the second region 41B. The tubular portion 41 holds the stator 30 with the fitting portion 44 in the inner peripheral face 41a. The stator core 31 has a lower end face that is partially in contact with the second step face 41d between the second region 41B and the third region 41C. The stator 30 is thus axially positioned with respect to the housing 40.

The housing 40 is manufactured by forming an aluminum alloy into a tubular shape by die casting molding, and then cutting by boring or lathing a portion where dimensional accuracy is required. The inner peripheral face 41a is formed as follows. First, a region (including the first region 41A and the second region 41B) located above the second step face 41d is cut, and then a region (including the first region 41A) located above the first step face 41c is cut. Accordingly, the third region 41C is not cut. In other words, the third region 41C is a region formed by die casting. Likewise, the outer peripheral face 41b of the tubular portion 41 is not cut. In other words, the outer peripheral face 41b of the tubular portion 41 is a region formed by die casting.

Since the tubular portion 41 is formed by die casting molding, the inner peripheral face 41a of the tubular portion 41 is formed into such a tapered shape that its diameter gradually decreases toward the bottom portion 45. Each of the first region 41A and the second region 42B on the inner peripheral face 41a undergoes cutting, and therefore has no tapered shape resulting from die casting molding. On the other hand, the third region 41C does not undergo cutting, and therefore has a tapered shape resulting from die casting molding. In other words, the tubular portion 41 has on its inner peripheral face 41a a tapered portion whose diameter gradually decreases downward. The tubular portion 41 has, at a position where the tapered portion 43 is provided, a thickness dimension that gradually increases downward. The tapered portion 43 is provided throughout the third region 41C. The tapered portion 43 is located below the fitting portion 44.

The tubular portion 41 has, in a lower end portion of the outer peripheral face 41b, a recessed portion 41e extending in the circumferential direction. The recessed portion 41e is opened radially outward. The recessed portion 41e extends in the circumferential direction. An axial position of the recessed portion 41e overlaps the tapered portion 43.

The tubular portion 41 has a thin portion 42 whose thickness is small since the recessed portion 41e is provided in the outer peripheral face 41b. As described above, the tapered portion 43 is provided throughout the third region 41C. On the other hand, the recessed portion 41e has a uniform axial depth. The thin portion 42 therefore has a thickness dimension that gradually increases downward. The thickness dimension of the thin portion 42 is minimized at an upper end of the thin portion 42. A thickness dimension $d2$ of the tubular portion 41 at the upper end portion of the thin portion 42 is smaller than a thickness dimension $d1$ of the tubular portion 41 at the portion where the fitting portion 44 is provided ($d1 > d2$).

According to the present example embodiment, the tubular portion 41 has in its outer peripheral face 41b the recessed portion 41e overlapping the tapered portion 43. This configuration enables a reduction in thickness of the tapered portion 43, which reduces the amount of a metal material used for manufacturing the housing 40. In manufacturing the housing 40 by die casting, the amount of the metal material directly leads to an increase in manufacturing cost. For this reason, the motor 1 is obtained at low cost by reducing the amount of the metal material.

If a member manufactured by die casting has a thick portion, a shrinkage cavity is apt to generate at the inside of the thick portion. The shrinkage cavity inside the member lowers the strength of the member. According to the present example embodiment, the recessed portion 41e is provided to overlap the tapered portion 43. This configuration therefore suppresses occurrence of an excessive increase in thickness resulting from the tapered portion 43, and also suppresses generation of a shrinkage cavity inside the housing 40. This configuration thus satisfactorily ensures the strength of the housing 40. The recessed portion 41e recessed radially inward enables a grasp on the housing by, for example, chucking in the process of manufacturing the motor.

According to the present example embodiment, the tubular portion 41 has the thin portion 42 extending in the circumferential direction, the thin portion 42 being located between the bottom portion 45 and the fitting portion 44 in the axial direction. In addition, the thickness dimension d2 of the tubular portion 41 at the upper end (i.e., the upper end of the recessed portion 41e) of the thin portion 42 is smaller than the thickness dimension d1 of the tubular portion 41 at the fitting portion 44. Therefore, the thin portion 42 is lower in rigidity than the fitting portion 44. As described above, the stator core 31 is fitted by shrinkage fitting into the fitting portion 44. The stator core 31 applies radially outward stress to the fitting portion 44 of the tubular portion 41. Therefore, the tubular portion 41 is slightly deformed in a direction along which its upper opening is open. As will be described later, the bottom portion 45 holds the lower bearing 6B. If the bottom portion 45 becomes deformed largely, the bottom portion 45 may fail to stably hold the lower bearing 6B.

According to the present example embodiment, the thin portion 42 having low rigidity is provided between the bottom portion 45 and the fitting portion 44. Therefore, the thin portion 42 is preferentially deformed, which makes the deformation of the tubular portion 41 caused by shrinkage fitting less prone to being transmitted to the bottom portion 45. This configuration thus reduces the amount of deformation of the bottom portion 45, and enhances the stability at the time when the bottom portion 45 holds the lower bearing 6B.

Figure 2:
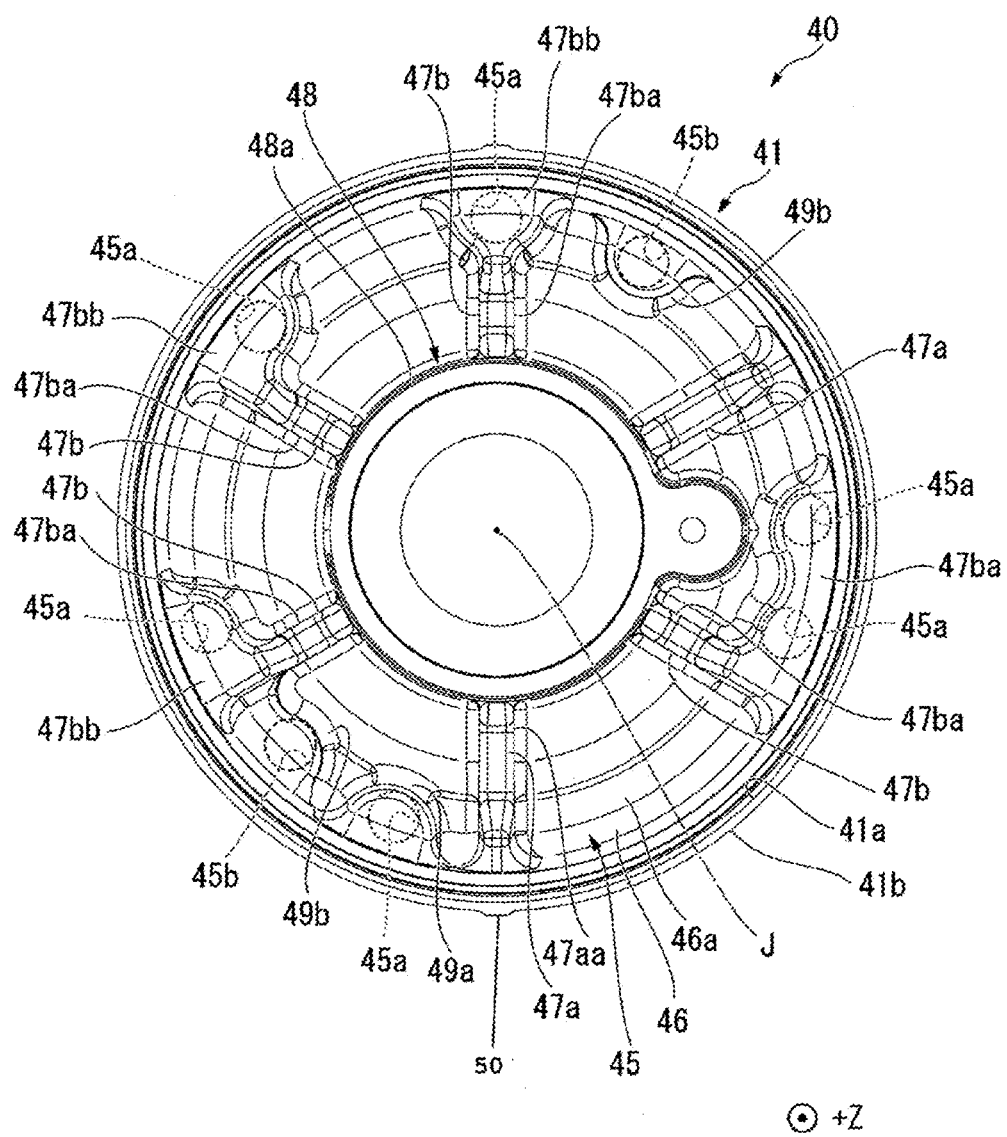
FIG. 2 is a plan view of a housing according to an example embodiment of the present disclosure.

FIG. 2 is a plan view of the housing 40. The bottom portion 45 is disposed inside the tubular portion 41. The bottom portion 45 closes the lower opening of the tubular portion 41. The bottom portion 45 has a bottom portion main body 46, a lower bearing holding portion (bearing holding portion) 48, a plurality of ribs 47a and 47b, and a plurality of projecting portions 49a and 49b.

As illustrated in FIG. 1, the bottom portion main body 46 extends radially inward from the inner peripheral face 41a of the tubular portion 41. The bottom portion main body 46 extends along the plane perpendicular to the center axis J. The bottom portion main body 46 is located between the lower bearing holding portion 48 and the inner peripheral face 41a of the tubular portion 41 in the radial direction. The bottom portion main body 46 has a substantially circular outer shape in plan view.

The bottom portion main body 46 has in its lower face 46b (i.e., a lower face of the bottom portion 45) a plurality of screw holes 45a and 45b. The screw holes 45a and 45b include a first screw hole 45a and a second screw hole 45b. The first screw hole 45a is deeper than the second screw hole 45b. Screws (not illustrated) are respectively inserted into the screw holes 45a and 45b to secure the motor 1 to an external apparatus (not illustrated).

As illustrated in FIG. 2, in the present example embodiment, the housing 40 has six first screw holes 45a and two second screw holes 45b. The first screw holes 45a and the second screw holes 45b each extend upward from the lower face 46b in the axial direction.

The six first screw holes 45a are arranged on a pitch circle having a center located on the center axis J. Likewise, the two second screw holes 45b are arranged on a pitch circle having a center located on the center axis J. The pitch circle on which the first screw holes 45a are arranged is slightly larger than the pitch circle on which the second screw holes 45b are arranged. In the present example embodiment, the first screw holes 45a, which are arranged in the circumferential direction, are spaced nonuniformly. Likewise, the second screw holes 45b, which are arranged in the circumferential direction, are spaced nonuniformly.

As illustrated in FIG. 1, the lower bearing holding portion 48 is located at a center of the bottom portion main body 46 in plan view. The lower bearing holding portion 48 holds the lower bearing 6B. The lower bearing holding portion 48 has a tube portion 48a having a center located on the center axis J and extending in the axial direction, and a lower end protruding portion 48b extending radially inward from a lower end of the tube portion 48a. The lower bearing 6B is disposed radially inward of the tube portion 48a. The tube portion 48a holds an outer race of the lower bearing 6B from the outer side in the circumferential direction. The lower end protruding portion 48b is in contact with a lower end of the outer race of the lower bearing 6B. The lower bearing 6B is axially positioned by the lower end protruding portion 48b. The lower end protruding portion 48b has a hole portion 48c as a through hole axially bored in a center thereof in plan view. The shaft 21 is inserted into the hole portion 48c.

The projecting portions 49a and 49b are disposed on an upper face 46a of the bottom portion main body 46. The projecting portions 49a and 49b project upward from the upper face 46a. The projecting portions 49a and 49b also project radially inward from the inner peripheral face 41a of the tubular portion 41.

As illustrated in FIG. 2, the projecting portions 49a and 49b include a first projecting portion 49a and a second projecting portion 49b. In the present example embodiment, the housing 40 has one first projecting portion 49a and two second projecting portions 49b. The first projecting portion 49a is larger in axial dimension than each second projecting portion 49b. Distal end portions of the first screw holes 45a are provided inside the first projecting portion 49a. In addition, distal end portions of the second screw holes 45b are provided inside the second projecting portions 49b.

The ribs 47a and 47b are disposed on the upper face 46a of the bottom portion main body 46. The ribs 47a and 47b project upward from the upper face 46a. The ribs 47a and 47b extend linearly in the radial direction. The ribs 47a and 47b connect the inner peripheral face 41a of the tubular portion 41 to the outer peripheral face of the tube portion 48a of the lower bearing holding portion 48. The ribs 47a and 47b are arranged equidistantly in the circumferential direction.

In the present example embodiment, the bottom portion 45 has the plurality of ribs 47a and 47b extending radially inward from the inner peripheral face 41a of the tubular portion 41. The ribs 47a and 47b enhance the rigidity of the bottom portion 45. Therefore, even when the tubular portion 41 becomes deformed because of shrinkage fitting on the stator core 31, the ribs 47a and 47b inhibit the deformation of the bottom portion 45. This configuration thus improves reliability at the time when the lower bearing holding portion 48 holds the lower bearing 6B.

As illustrated in FIG. 1, each of the ribs 47a and 47b has an upper end located below the upper end of the thin portion 42 of the tubular portion 41. As described above, the thickness dimension of the thin portion 42 is minimized at the upper end. Since the upper ends of the ribs 47a and 47b are located below the upper end of the thin portion 42, the ribs 47a and 47b do not enhance the rigidity of the thinnest portion of the thin portion 42. Therefore, the upper end of the thin portion 42 is preferentially deformed, which makes the deformation of the tubular portion 41 caused by shrinkage fitting less prone to being transmitted to the bottom portion 45.

As illustrated in FIG. 1, each of the ribs 47a and 47b has an oblique face 47d. The oblique faces 47d extend upward while extending radially outward to reach the inner peripheral face 41a of the tubular portion 41. The ribs 47a and 47b enhance the rigidity of the tubular portion 41 by virtue of the oblique faces 47d. This configuration thus inhibits vibration of the housing 40 accompanied with the rotation of the rotor 20.

In the present example embodiment, each of the oblique faces 47d is a curved face that is curved at a predetermined radius of curvature. Each of the oblique faces 47d may alternatively be a flat face that is inclined at a certain inclination angle. However, when each of the oblique faces 47d is a curved face smoothly connected to the inner peripheral face 41a of the tubular portion 41, the rigidity of the tubular portion 41 is effectively enhanced.

As illustrated in FIG. 2, the ribs 47a and 47b include a first rib 47a and a second rib 47b. In the present example embodiment, the housing 40 has two first ribs 47a and four second ribs 47b. In the present example embodiment, the housing 40 also has an outer rib 50.

Each of the first ribs 47a has a first rib main body 47aa extending in the radial direction with a uniform width. Each of the first ribs 47a extends in the radial direction with a uniform width. On the other hand, each of the second ribs 47b has a proximal end portion 47bb expanding in the circumferential direction, the proximal end portion 47bb being located at a radially outer end thereof, and a second rib main body 47ba extending radially inward from the proximal end portion 47bb with a uniform width.

The distal end portions of the first screw holes 45a are provided inside the proximal end portions 47bb of the second ribs 47b. Two of the first screw holes 45a are bored in the proximal end portion 47bb of one of the four second ribs 47b.

Each of the second ribs 47b has high rigidity because of its proximal end portion 47bb, but is made of a large amount of a metal material. In contrast to this, each of the first ribs 47a has no proximal end portion 47bb, and is therefore made of a reduced amount of a metal material. In the present example embodiment, the bottom portion 45 has the second ribs 47b each having the proximal end portion 47bb and the first ribs 47a each having no proximal end portion 47bb. This configuration thus effectively improves the rigidity of the bottom portion 45 while reducing the amount of the metal material as a whole.

As described above, the first screw holes 45a are spaced nonuniformly in the circumferential direction. The second ribs 47b have the first screw holes 45a bored therein. Therefore, the second ribs 47b are spaced nonuniformly in the circumferential direction as in the first screw holes 45a. Each of the first ribs 47a is located at a larger circumferential clearance between two of the second ribs 47b arranged in the circumferential direction. This configuration enhances the circumferential rigidity of the bottom portion 45 and the circumferential rigidity of the tubular portion 41 in balance. In manufacturing the housing 40 by die casting molding, a die is uniformly filled with a metal material in the circumferential direction, leading to improvement in dimensional accuracy of each component.

Although the example embodiment and modification of the present disclosure have been described above, the respective configurations, the combination of the respective configurations, and the like in the example embodiment and modification are merely examples; therefore, any additions, omissions, substitutions, and other alterations may be made on the configurations within a range departing from the scope of the present disclosure. In addition, the present disclosure is not limited to the foregoing example embodiment.

The advantageous effects of the foregoing example embodiment are obtained in a case where the stator core 31 is secured by press fitting to the tubular portion 41 in addition to the case where the stator core 31 is secured by shrinkage fitting to the tubular portion 41. In other words, the stator core 31 may be secured by press fitting to the tubular portion 41.

Figure 3:
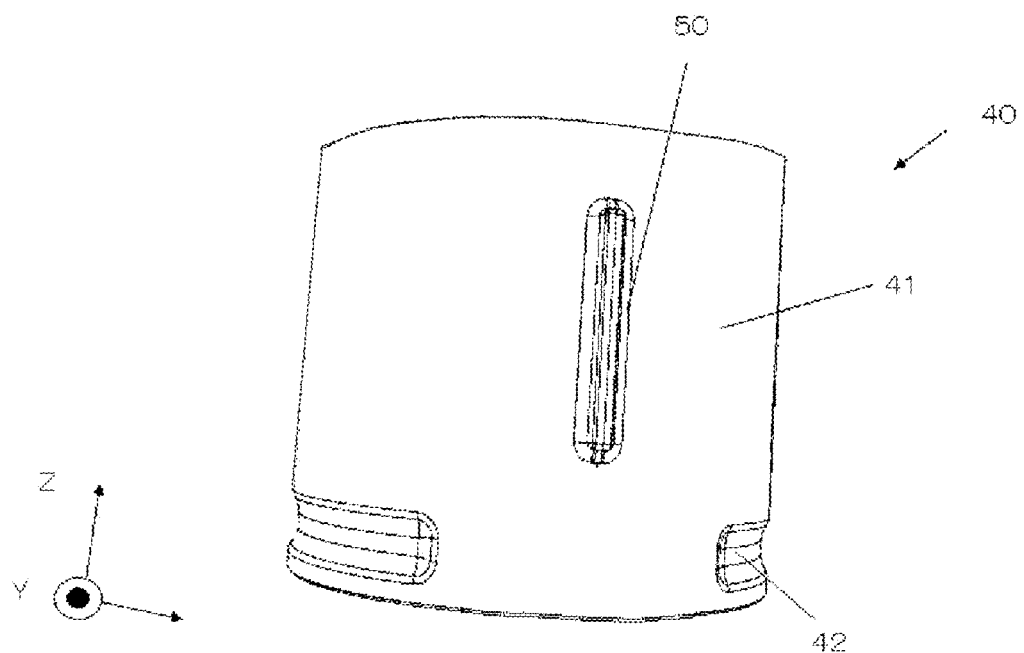
FIG. 3 is an external view of the housing according to an example embodiment of the present disclosure.

FIG. 3 is an external view of the housing according to the present example embodiment. As illustrated in FIG. 3, the housing 40 has the outer rib 50. The outer rib 50 projects radially outward from the outer peripheral face 41b of the tubular portion 41, and extends in the axial direction. The outer rib 50 is disposed at the center of the tubular portion 41. The outer rib 50 enhances the rigidity of the tubular portion 41. The outer rib 50 circumferentially overlaps the screw holes 45a and 45b. This configuration thus suppresses stress to be applied from the screw holes 45a and 45b to the housing 40. The outer rib 50 is different in axial position from the recessed portion 41e. The outer rib 50 is different in circumferential position from the recessed portion 41e. The outer rib 50 and the recessed portion 41e are alternately arranged in the circumferential direction. FIG. 3 illustrates two recessed portions 41e and two outer ribs 50. This configuration thus reduces the amount of the material for the housing 40 while suppressing stress to be applied from the screw holes 45a and 45b to the housing 40.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
    a rotor including a shaft disposed along a center axis extending in a lengthwise direction, the rotor being rotatable about the center axis;
    a stator disposed opposite the rotor with a clearance defined between the stator and the rotor in a radial direction;
    a housing accommodating the rotor and the stator; and
    a bearing supporting the shaft in a rotatable manner; wherein
    the housing includes:
        a tubular portion extending along the center axis; and
        a bottom portion closing a lower opening of the tubular portion;
    the bottom portion includes bearing holding portion to hold the bearing;
    the tubular portion includes, on its inner peripheral surface, a fitting portion fitted to the stator, and a tapered portion with a diameter that gradually decreases downward, the tapered portion being located below the fitting portion;
    the tubular portion includes, in its outer peripheral surface, a recessed portion with an axial position that overlaps the tapered portion, the recessed portion extending in a circumferential direction;

the bottom portion includes a rib which projects upward in parallel with the center axis;

the rib connects the inner peripheral surface of the tubular portion to an outer peripheral surface of the bearing holding portion; and the rib includes:
- a first oblique surface extending upward along the center axis while extending radially outward to reach the inner peripheral surface of the tubular portion;
- a second oblique surface extending upward along the center axis while extending radially inward to reach the outer peripheral surface of the tubular portion; and
- an upper end of the first oblique surface is located axially above an upper end of the second oblique surface.

2. The motor according to claim 1, wherein a thickness of the tubular portion at an upper end of the recessed portion is smaller than a thickness of the tubular portion at the fitting portion.

3. The motor according to claim 1, wherein the bottom portion includes a plurality of ribs arranged in the circumferential direction and extending radially inward from the inner peripheral surface of the tubular portion.

4. The motor according to claim 3, wherein each of the plurality of ribs includes an upper end located below an upper end of the recessed portion.

5. The motor according to claim 3, wherein
the plurality of ribs include a first rib and a second rib;
the first rib extends in the radial direction with a uniform width;
the second rib includes, on its radially outer end, a proximal end portion expanding in the circumferential direction; and
the proximal end portion includes a screw hole extending from a lower surface of the bottom portion.

* * * * *